United States Patent
Leslie et al.

(10) Patent No.: US 10,953,747 B2
(45) Date of Patent: Mar. 23, 2021

(54) THROTTLE ATTACHMENTS AND TOWING TRACTOR ASSEMBLIES

(71) Applicant: Toyota Motor Engineering & Manufacturing North America, Inc., Plano, TX (US)

(72) Inventors: Gregory K. Leslie, Lexington, KY (US); Randall K. Leslie, Lexington, KY (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 222 days.

(21) Appl. No.: 15/984,591

(22) Filed: May 21, 2018

(65) Prior Publication Data
US 2019/0351763 A1    Nov. 21, 2019

(51) Int. Cl.
*B60K 26/02* (2006.01)
*B62D 1/04* (2006.01)

(52) U.S. Cl.
CPC .............. *B60K 26/02* (2013.01); *B62D 1/046* (2013.01); *B60K 2026/028* (2013.01)

(58) Field of Classification Search
CPC ...... B66F 9/20; B66F 9/07504; B66F 9/0759; B66F 9/07568; G05G 1/04; G05G 1/10; G05G 1/54; B62D 51/001; B62D 1/0463; B62D 1/14; B62D 1/046; H01H 2009/068
See application file for complete search history.

(56) References Cited

U.S. PATENT DOCUMENTS

| | | | | |
|---|---|---|---|---|
| 3,937,629 A | * | 2/1976 | Hamasaka | B62K 21/125 74/551.8 |
| 4,716,980 A | * | 1/1988 | Butler | B62D 51/002 180/19.2 |
| 5,007,301 A | * | 4/1991 | Powell | B62D 51/001 74/543 |
| 5,775,167 A | * | 7/1998 | Maietta | B62K 11/14 74/480 R |
| 6,457,208 B1 | * | 10/2002 | Keith | E05B 1/0053 16/422 |
| 7,000,498 B2 | * | 2/2006 | Hancock | B62K 23/06 74/488 |
| 7,806,023 B2 | * | 10/2010 | Fowler | B62K 11/14 74/527 |
| 8,746,377 B1 | | 6/2014 | Dunbar | |
| 9,731,779 B2 | | 8/2017 | Lamb | |
| 2001/0013435 A1 | * | 8/2001 | Ono | B62B 5/0026 180/19.2 |
| 2005/0011300 A1 | * | 1/2005 | Gates | B62K 11/14 74/544 |
| 2006/0225937 A1 | * | 10/2006 | Lemoine | B62K 23/02 180/219 |
| 2009/0242285 A1 | | 10/2009 | Whetstone, Jr. | |

(Continued)

FOREIGN PATENT DOCUMENTS

| | | | |
|---|---|---|---|
| JP | 07255787 A | * | 10/1995 |
| JP | 09038147 A | * | 2/1997 |
| JP | 09150644 A | * | 6/1997 |

*Primary Examiner* — Luis A Gonzalez
(74) *Attorney, Agent, or Firm* — Dinsmore & Shohl LLP

(57) ABSTRACT

A throttle attachment includes an attachment portion configured to engage a throttle of a vehicle, and an elongate handle extending from the attachment portion. Rotation of the elongate handle causes rotation of the throttle attachment.

15 Claims, 9 Drawing Sheets

(56) References Cited

U.S. PATENT DOCUMENTS

| | | | |
|---|---|---|---|
| 2011/0271782 A1* | 11/2011 | Perk | A61G 5/047 74/484 R |
| 2014/0125021 A1 | 5/2014 | Du Toit | |
| 2018/0009459 A1 | 1/2018 | Johnson et al. | |

* cited by examiner

THROTTLE ATTACHMENTS AND TOWING TRACTOR ASSEMBLIES

TECHNICAL FIELD

The present specification generally relates to throttle attachments and towing tractor assemblies and, more specifically, throttle attachments and towing tractor assemblies having ergonomic characteristics.

BACKGROUND

Towing tractors, such as those used in warehouses to move quantities of product, may be equipped with a throttle attached to a steering handle. These throttles may be manipulated by a user's thumb to rotate the throttle forward or backward to drive the towing tractor in a forward direction or in a reverse direction, respectively. Often these throttles need to be continuously engaged by the user throughout operation of the towing tractor. Continuous engagement of the throttle with the user's thumb may cause the user's hand to become sore or stiff.

Accordingly, a need exists for alternative throttle attachments and towing tractor assemblies having ergonomic characteristics.

SUMMARY

In one embodiment, a throttle attachment includes an attachment portion configured to engage a throttle of a vehicle, and an elongate handle extending from the attachment portion. Rotation of the elongate handle causes rotation of the throttle.

In another embodiment, a towing tractor assembly includes a towing tractor including a throttle, and a throttle attachment positioned over and in contact with the throttle. Rotation of the throttle attachment causes rotation of the throttle.

In yet another embodiment, a towing tractor assembly includes a towing tractor and a throttle attachment. The towing tractor includes a steering assembly including a steering handle and a throttle rotatably coupled to the steering handle. The throttle attachment is positioned over and in contact with the throttle. Rotation of the throttle attachment causes rotation of the throttle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The figures generally depict an embodiment of a throttle attachment and a towing tractor assembly including a throttle attachment. The throttle attachment is configured to be positioned over and in contact with a throttle of the towing tractor such that rotation of the throttle attachment causes the throttle to rotate and thus activates the throttle. By providing a throttle attachment as provided herein, a position of engagement between the user and the throttle can be changed to allow for more comfortable engagement of the throttle. That is, the point of contact to activate the throttle may be changed so as to provide a more ergonomic position at which a user can engage the throttle.

Figure 1A:
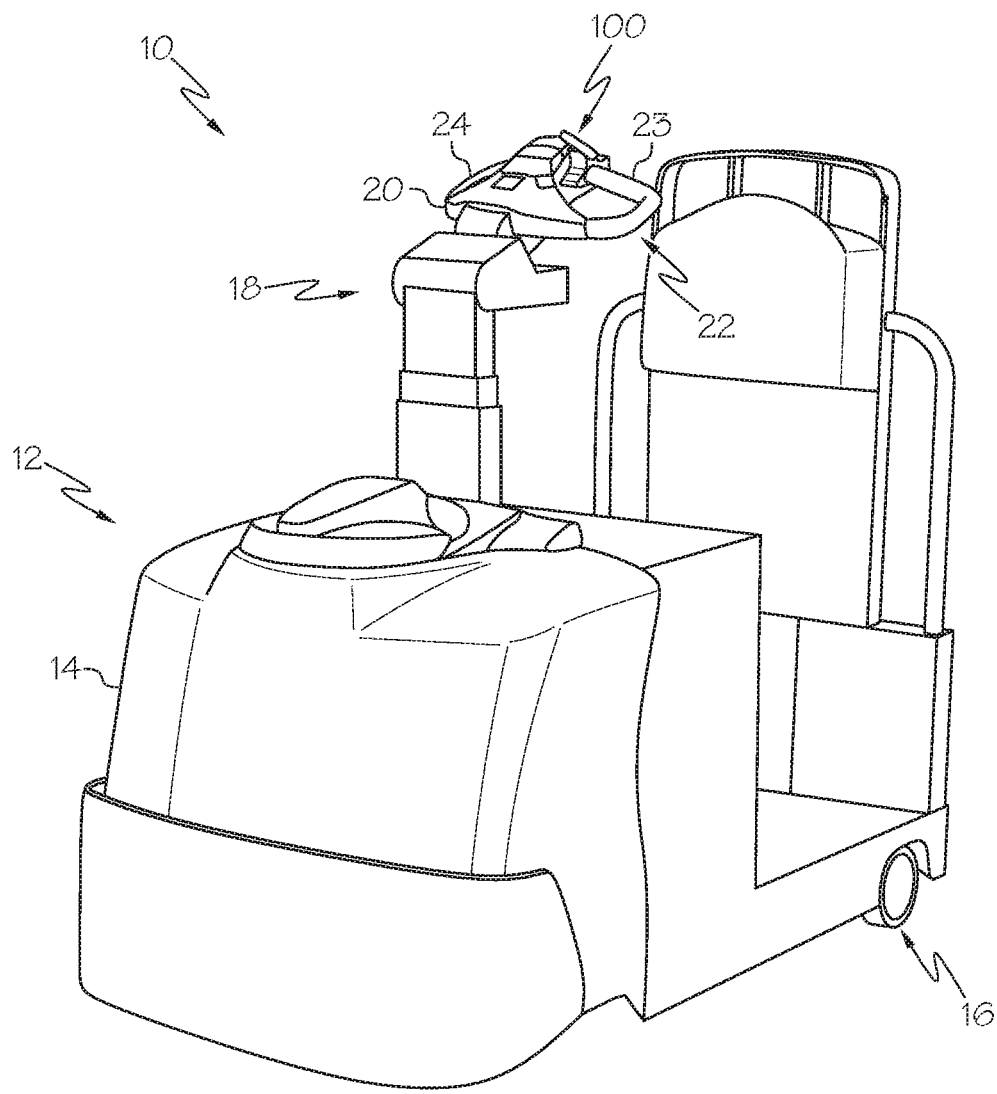
FIG. 1A depicts a towing tractor assembly, according to one or more embodiments shown and described herein.

FIG. 1A illustrates a perspective view of a towing tractor assembly 10. The towing tractor assembly 10 includes a towing tractor 12 and a throttle attachment 100.

The towing tractor 12 includes a moveable body 14. The moveable body 14 may be capable of movement through motorized wheels 16 or the like. The towing tractor 12 further includes a steering assembly 18 for directing the moveable body 14 to various locations. For example, the steering assembly 18 is operatively coupled to at least some of the wheels 16 of the towing tractor 12 such that rotation of the steering assembly 18 causes one or more of the wheels 16 to rotate in a desired direction of travel. Power to move the towing tractor 12 may be provided by a drive unit such as an electric motor, combustion engine, or a combination thereof housed within the moveable body 14. The moveable body 14 may define a platform or seat for a user to be positioned for steering the towing tractor 12. Towing tractors may be used for material handling vehicles that are commonly used to transport pallets or containers of goods or raw materials in warehouses. Accordingly, the towing tractor 12 may be equipped to pull a trailer behind it or may be configured with fork lifts to lift objects in front of it. However, it is contemplated and possible that the throttle attachment 100 as described herein may be used in conjunction with other vehicle types (recreational vehicles, utility vehicles, and the like) without departing from the scope of the present disclosure.

Figure 1B:
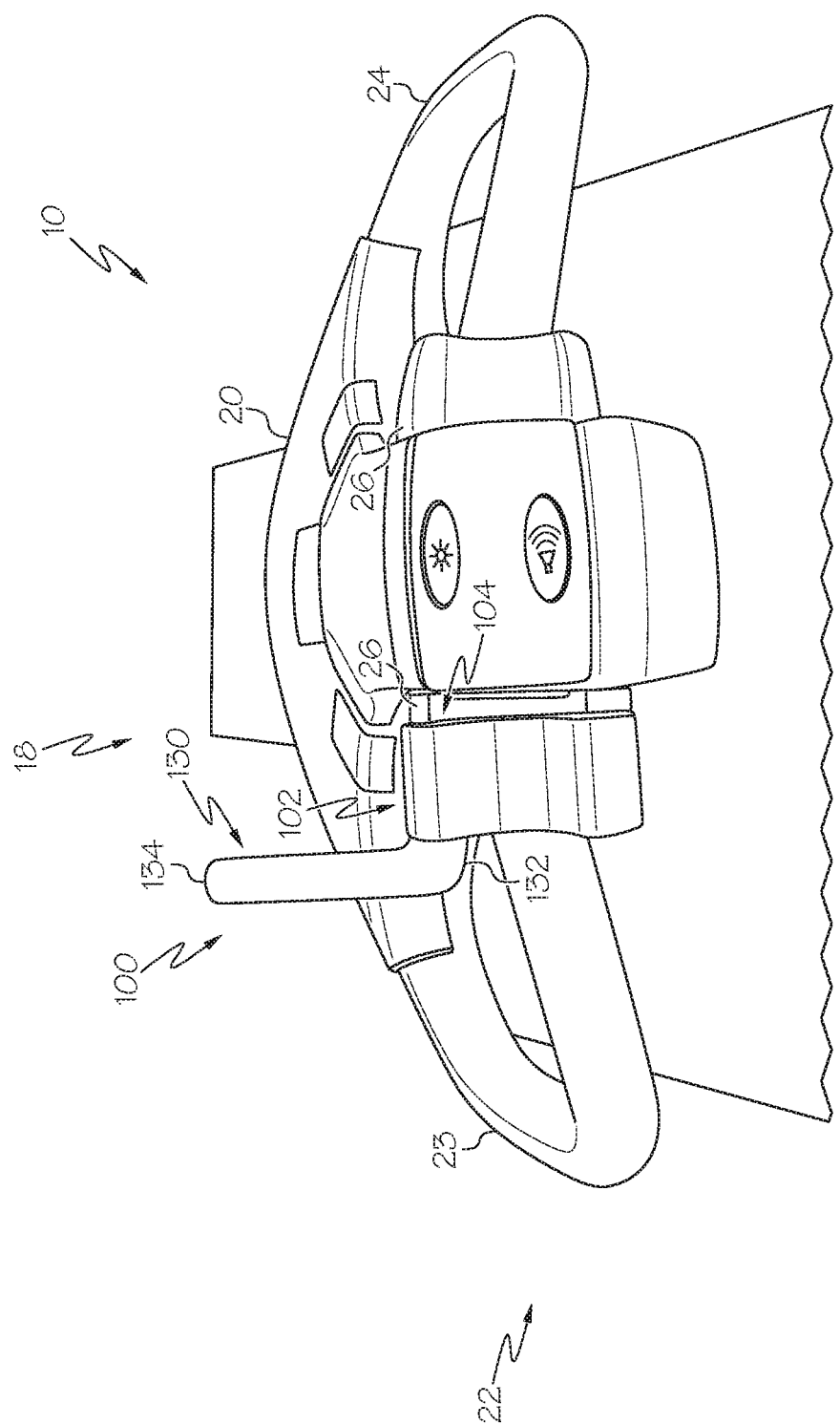
FIG. 1B depicts a steering assembly of the towing tractor assembly of FIG. 1A, according to one or more embodiments shown and described herein.

FIG. 1B illustrates a more detailed depiction of the steering assembly 18 of the towing tractor 12. In the illustrated embodiment, the steering assembly 18 includes a hub 20 that may include various controls (e.g., horn control, light control, and the like) of the towing tractor 12. Coupled to the hub 20 may be one or more steering handles for placement of a user's hands for steering the towing tractor 12. For example, the illustrated embodiment of the towing tractor 12 includes a first steering handle 23 and a second steering handle 24 positioned on either side of the hub 20. When in use, a user might place a left hand on the first steering handle 23 and a right hand on the second steering handle 24. A space may be formed between the one or more steering handles and the hub 20 to allow a user's hand(s) to grip around the one or more steering handles.

Figure 2:
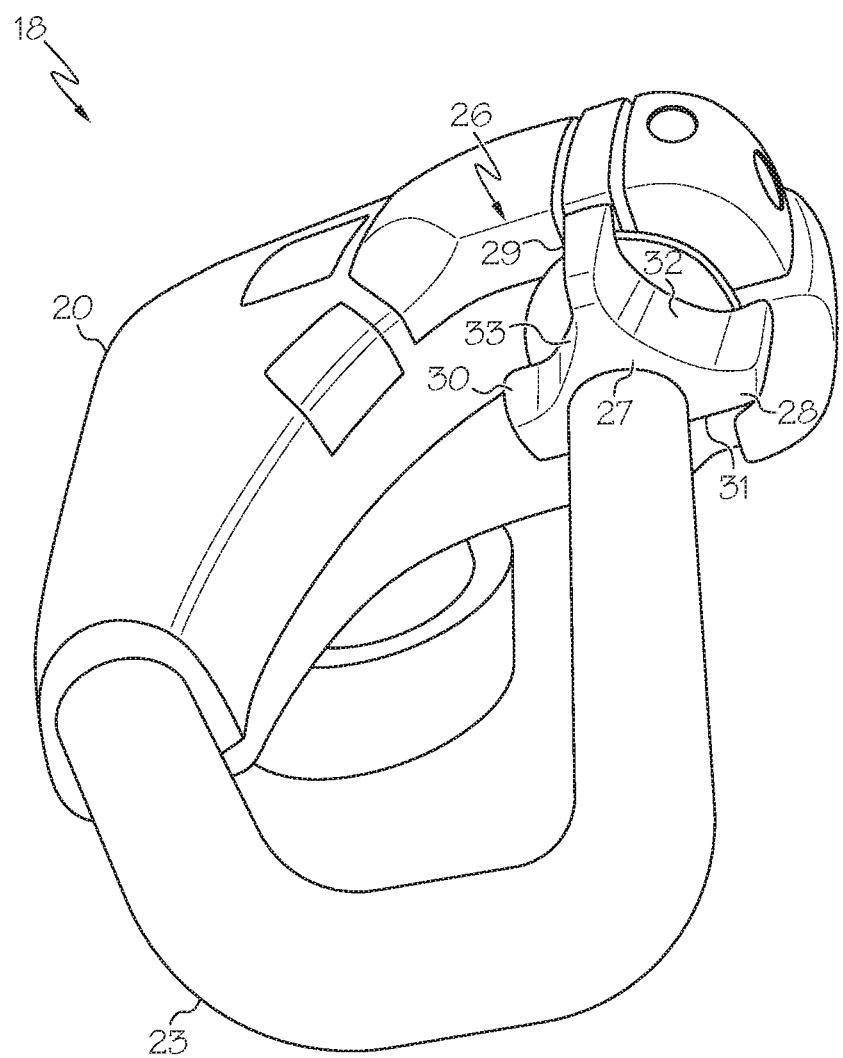
FIG. 2 depicts a throttle of the towing tractor assembly without a throttle attachment, according to one or more embodiments shown and described herein.

The steering assembly 18 further includes a throttle 26, illustrated as partially covered by the throttle attachment 100. Referring also to FIG. 2, a side view of the steering assembly 18 without the throttle attachment 100 is illustrated. The throttle 26 is operatively coupled to the drive unit, wherein manipulating the throttle 26 causes the drive unit to move the towing tractor 12. The throttle 26, without the throttle attachment 100, may be configured to be operated by a user's hand. For example, the throttle 26 may be rotatably coupled to one of the first steering handle 23 and the second steering handle 24. In some embodiments, the steering assembly 18 may have a throttle 26 rotatably coupled to each of the first and second handle 23, 24 for application of force by either a left-handed user or a right-handed user. The throttle 26 may be positioned between the handle (e.g., first and/or second handle 23, 24) and the hub 20. Accordingly, the throttle 26 may be positioned proximate to a portion of the hub 20. Rotation of the throttle 26 in the counterclockwise direction may cause the towing tractor 12 to move in a forward direction while rotation of the throttle 26 in a counterclockwise direction may cause the towing tractor 12 to move in a rearward/reverse direction. In some embodiments, the further the throttle 26 is rotated in either direction, the faster the towing tractor 12 moves.

Still referring to FIG. 2, though the throttle 26 may have any shape, in some embodiments, the throttle 26 has a 3-wing shape. That is, the throttle 26 may include a center portion 27 through which an axis of rotation extends and three wings (e.g., wing 28, wing 29, and wing 30) that extend from the center portion 27 so as to form a generally triangular shape. In such embodiment, the throttle 26 may include a base wall 31 that extends between wing 28 and wing 30 and side walls 32, 33 that extend between wings 28 and 29 and wings 29 and 30 respectively. In some embodiments, one or more of the walls (e.g., base wall 31, side wall 32, and side wall 33) of the throttle 26 may be sloped. In the illustrated embodiments, the side walls 32 and 33 have a concave slope while the base wall 31 is flat or slightly curved. Under conventional practices, to operate the throttle 26 a user would directly engage their thumb with the side wall 33 to rotate the throttle 26 in a clockwise or counter-clockwise direction. However, as noted herein, holding the throttle 26 continuously in position may become wearisome and/or uncomfortable for the user. Moreover, the throttle 26 may be over-rotated, leading to wear on the throttle 26.

Figure 3A:
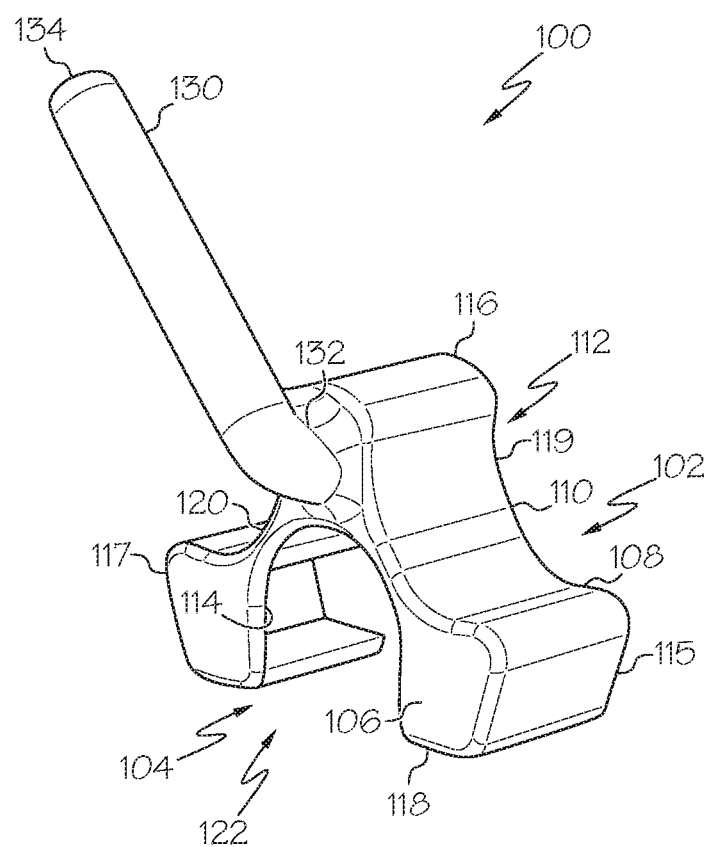
FIG. 3A depicts a perspective view of a throttle attachment in isolation, according to one or more embodiments shown and described herein.
Figure 3B:
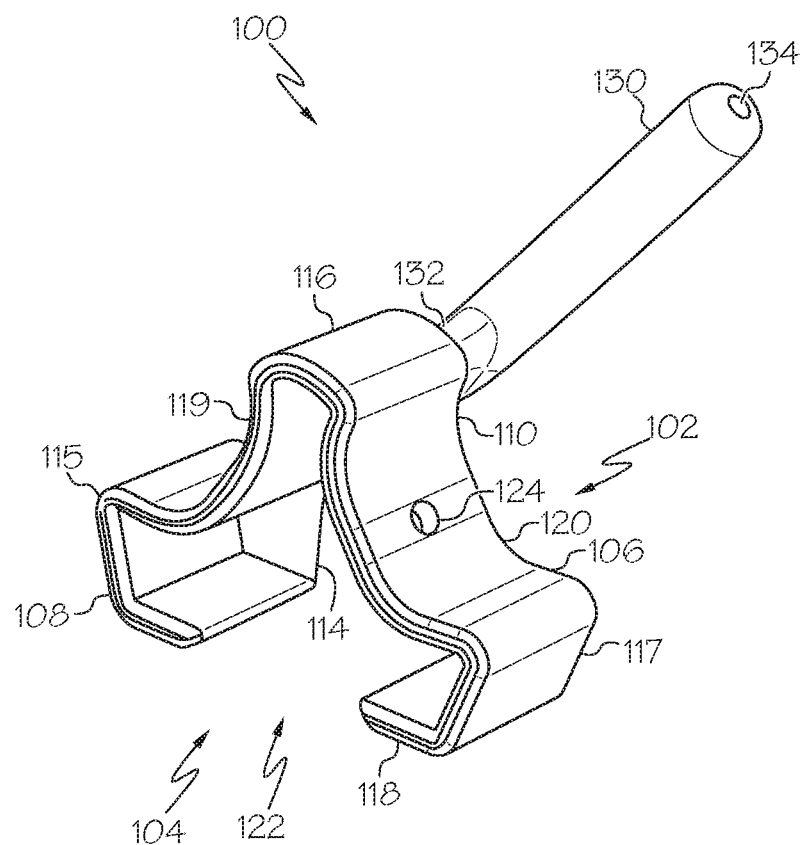
FIG. 3B depicts a rear perspective view of the throttle attachment of FIG. 3A, according to one or more embodiments shown and described herein.
Figure 3C:
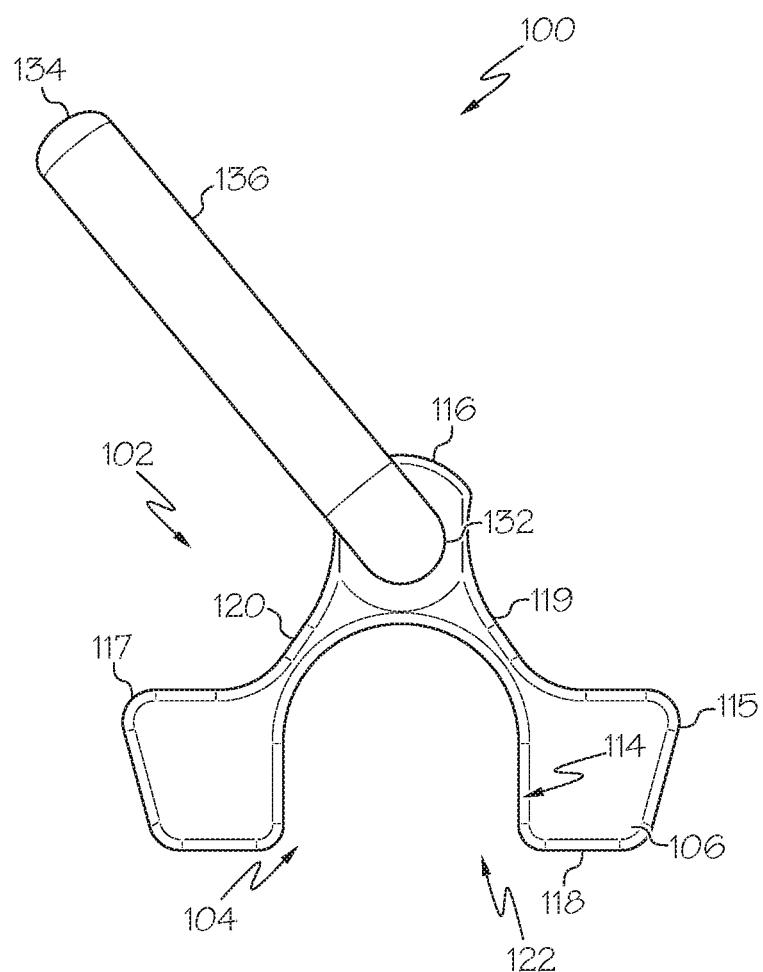
FIG. 3C depicts a side view of the throttle attachment of FIG. 3A, according to one or more embodiments shown and described herein.
Figure 3D:
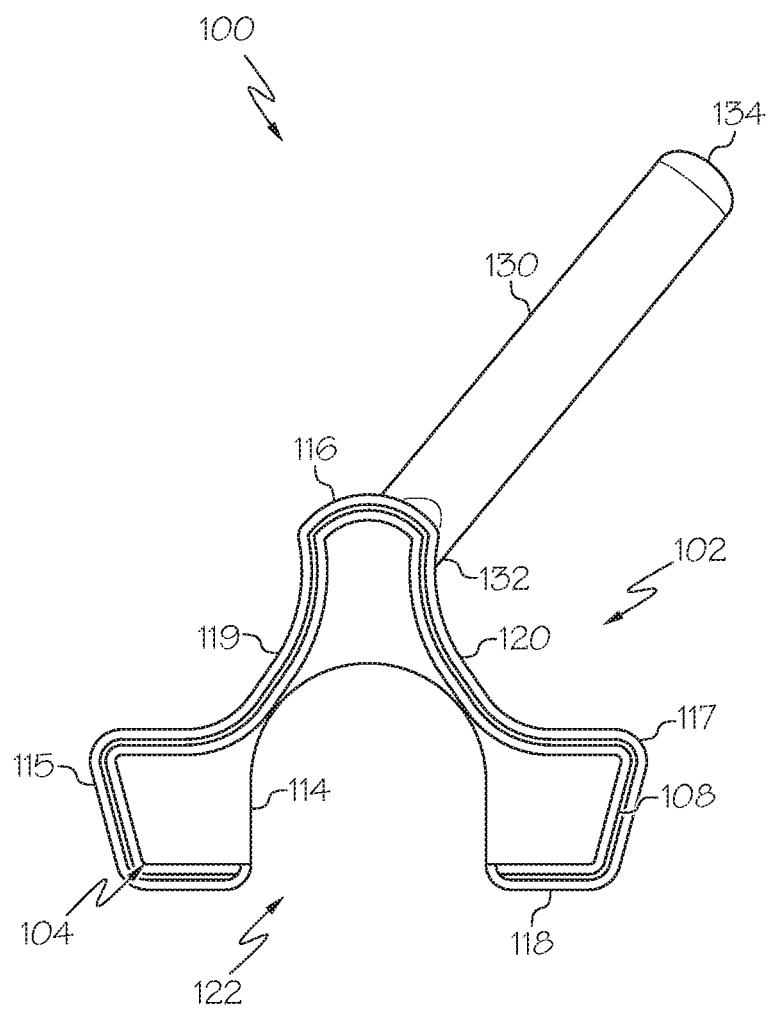
FIG. 3D illustrates an opposite side view of the throttle attachment of FIG. 3C, according to one or more embodiments shown and described herein.

FIGS. 3A-3D illustrate various perspectives of the throttle attachment 100 in isolation from the towing tractor assembly 10 illustrated in FIGS. 1A-2. In particular, FIG. 3A illustrates a front perspective view of the throttle attachment 100, FIG. 3B illustrates a rear perspective view of the throttle attachment 100, FIG. 3C illustrates a side view of the throttle attachment 100, and FIG. 3D illustrates a side view of the throttle attachment 100 opposite of the view shown in FIG. 3C. Referring collectively to FIGS. 3A-3D, the throttle attachment 100 includes an attachment portion 102 configured to engage a throttle of a vehicle (e.g., the towing tractor 12 illustrates FIGS. 1A-2) and an elongate handle 130 that extends from the attachment portion 102. As will be described in greater detail, when in position and contacted with the throttle 26 (such as illustrated in FIG. 1B), rotation of the elongate handle 130 causes rotation of the throttle 26. The elongate handle 130 allows a user to change a position of their hand from directly operating the throttle 26 with the user's thumb, as discussed above, to gripping the elongate handle 130 and pushing/pulling the elongate handle 130 to operate the throttle 26. For example, the elongate handle 130 may be grasped in a user's palm and pushed or pulled to a desired operating position.

Referring specifically to FIGS. 3B and 3D, the attachment portion 102 defines a recess 104 configured to receive a shape of a target throttle (e.g., throttle 26 illustrated in FIG. 2A) therein. In some embodiments, the recess 104 may substantially conform to the shape of the target throttle for attachment. That is, the recess 104 may substantially conform to a contour of an outside perimeter of the target throttle so as to contact the target throttle in a substantially continuous manner long at least a portion of the outside perimeter of the target throttle.

Still referring to FIGS. 3A-3D, the attachment portion 102 may include a first side 106, a second side 108 spaced from the first side 106, and a joining wall 110 extending between the first side 106 and the second side 108 to connect the first side 106 to the second side 108. The first side 106 and the second side 108 may be substantially parallel to one another. The recess 104 may extend through the second side 108 of the attachment portion 102, such that there is a throttle opening 112 formed in the second side 108 of the attachment portion 102. In some embodiments, the recess 104 may extend through the first side 106 such that there is a steering handle opening 114 formed in the first side 106, such that when the throttle attachment 100 is engaged over and in contact with the throttle 26, the steering handle 23 may extend through the first side of the attachment portion 102 (see FIGS. 1A, 1B, and 5). Accordingly, the throttle opening 112 may be shaped so as to substantially conform to a profile of the steering handle 23. Moreover, the throttle opening 112 may encompass a larger area than the steering handle opening 114.

A shape of the first side 106 and/or the second side 108 of the attachment portion 102 may define an outside perimeter of the attachment portion 102. The joining wall 110 may extend along the outside perimeter. For example, wherein a target throttle has a three-wing shape as described above with respect to FIG. 2, the shape of the attachment portion 102 may include a first attachment wing 115, a second attachment wing 116, and a third attachment wing 117 which form a generally triangular shape (or outside perimeter). The joining wall 110 may accordingly define a base attachment wall 118 and two side attachment walls 119, 120. As with the above-described throttle 26, one or more portions of the joining wall 110 may be sloped. For example, and as illustrated, the side attachment walls 119, 120 may be sloped (e.g., with a concave slope). The internal contours of the recess 104 may substantially reflect the outer shape of the attachment portion 102.

Figure 5:
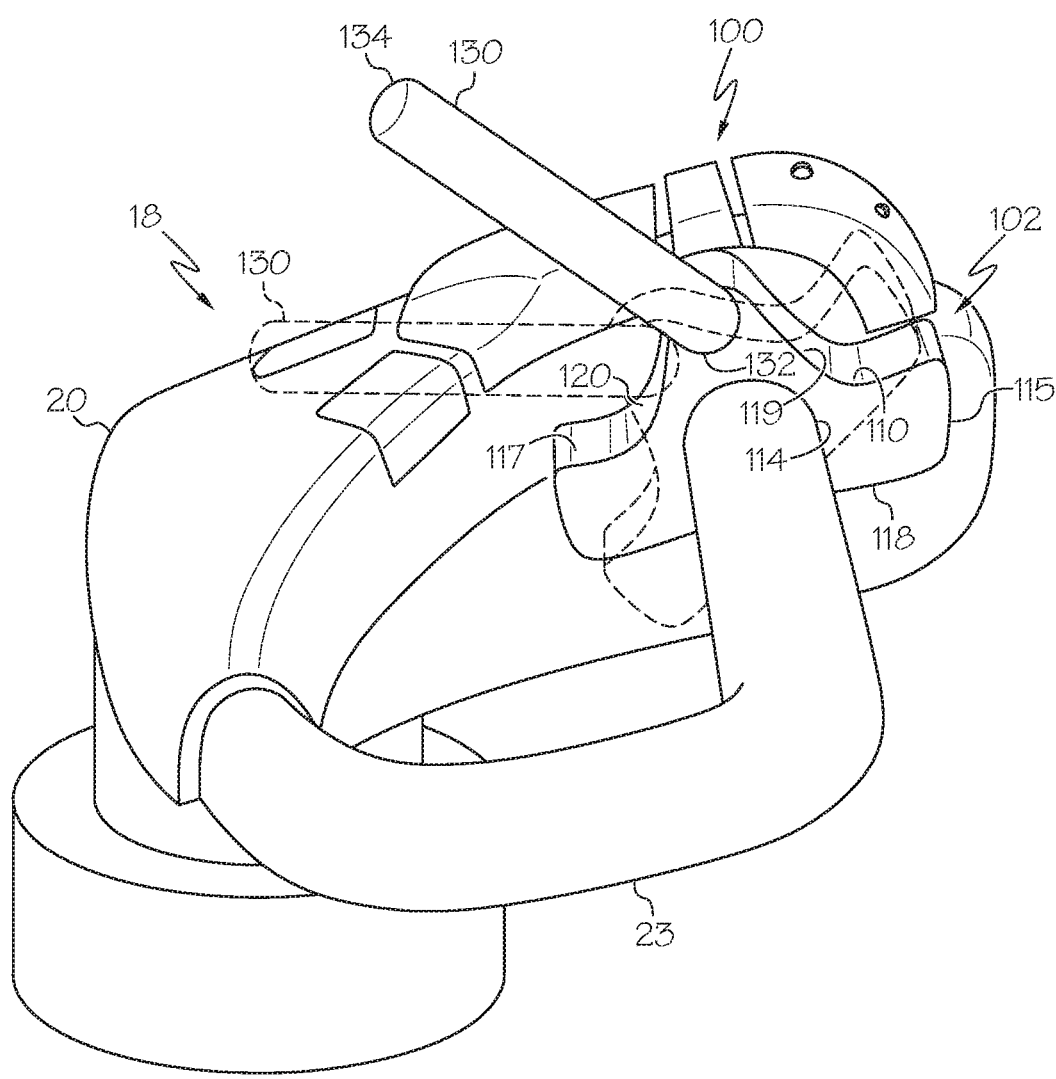
FIG. 5 depicts a side view of the throttle attachment positioned over and in contact with the throttle depicted in FIG. 2, according to one or more embodiments shown and described herein.

In some embodiments, the joining wall 110 may be discontinuous along the outside perimeter of the attachment portion 102 to allow for passage of the steering handle 23 into the steering handle opening 114 (see FIG. 5). For example, the joining wall 110 may be discontinuous along the base attachment wall 118 as illustrated to provide opening 122 which may be sized to allow passage of the steering handle 23 to pass there through.

The elongate handle 130 extends from the attachment portion 102 to provide a handle for a user to manipulate. Though the elongate handle 130 may be positioned anywhere on the attachment portion 102, in some embodiments, the elongate handle 130 extends from the first side of the attachment portion 102. The elongate handle 130 may extend from the first side of the attachment portion 102 at a position spaced from the steering handle opening 114. For example, the elongate handle 130 may protrude from the first side of the attachment portion 102 at a position above the steering handle opening 114. The elongate handle 130 may extend beyond the outside perimeter of the of the attachment portion 102 from a proximal end 132 attached to the attachment portion 102 to a free end 134. The elongate handle 130 may extend from the first side 106 of the attachment portion 102 such that the elongate handle 130 is substantially parallel to the first side 106 of the attachment portion 102. In some embodiments, the elongate handle 130 may extend along an axis that is oriented at an oblique angle relative to the base attachment wall 118 of the joining wall 110. However, other orientations a contemplated and possible. The elongate handle 130 may be coupled to the attachment portion 102 through conventional manufacturing methods (e.g., adhesives, fasteners, etc.) or the elongate handle 130 may be integrally formed with the attachment portion 102.

The throttle attachment 100 may be produced by any conventional machining techniques from any conventional materials (e.g., plastic). In one embodiment, the throttle attachment 100 is produced from nylon using 3-D printing technology. 3-D printing may allow for more exactly manufactured contours to better engage a particular throttle 26 shape.

Figure 4:
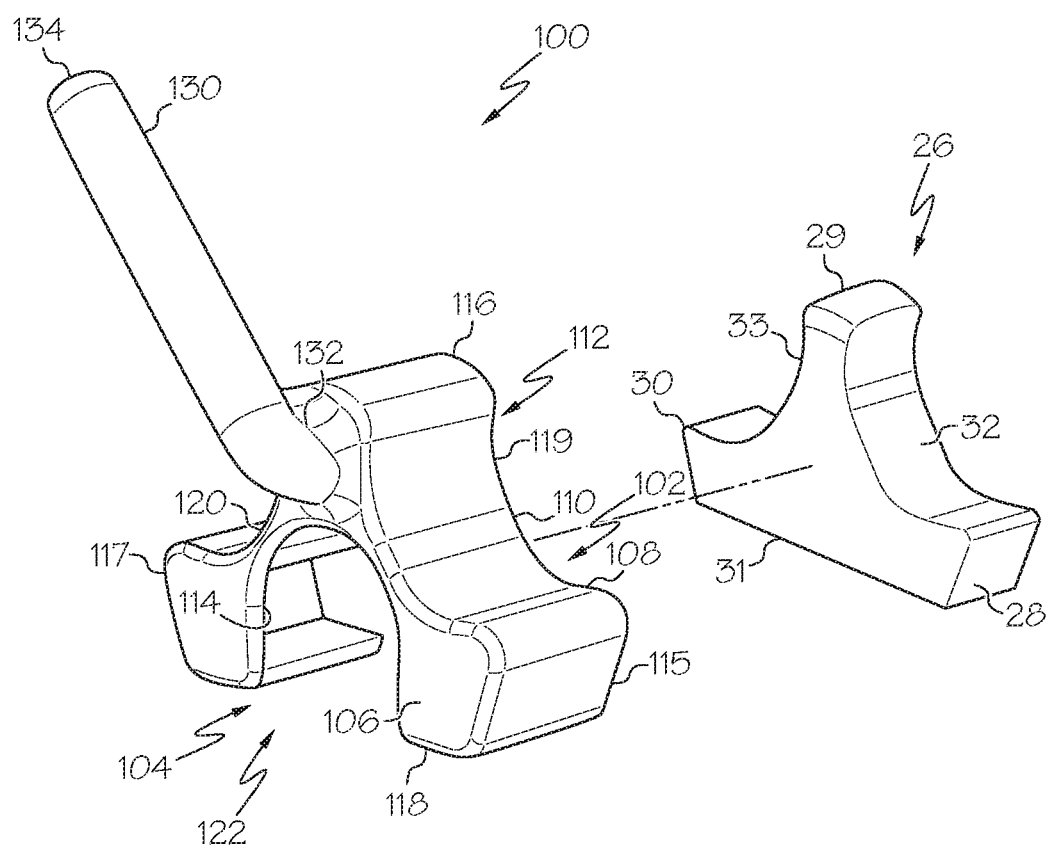
FIG. 4 illustrates a view of the throttle attachment illustrated in FIGS. 3A-3D spaced apart from a throttle in isolation from a steering assembly, according to one or more embodiments shown and described herein.

As shown in FIG. 1B, the throttle attachment 100 is configured to be positioned over and in contact with the throttle 26 of the towing tractor 12 such that rotation of the throttle attachment 100 causes rotation of the throttle 26. FIG. 4 generally illustrates the throttle attachment 100 spaced apart from a throttle 26. In the illustrated embodiments, an outer contour of the throttle 26 substantially matches the inner contour of the recess 104. That is the attachment wings 115, 116, and 117 of the throttle attachment 100 are designed to receive the shape of throttle wings 28, 29, and 30 of the throttle 26. Accordingly, the throttle attachment 100 can slide over and contact the outer contour of the throttle 26.

FIG. 5 illustrates a side view of the steering assembly 18 with the throttle attachment 100 positioned over and in contact with the throttle 26 (shown in FIG. 1B). The elongate handle 130 extending from the attachment portion 102 allows a user to adjust the positioning their hand for a more ergonomic interaction with the throttle 26 of the towing tractor 12. Rotation of the throttle attachment 100, and therefore rotation of the throttle 26 to which it is engaged is illustrated in FIG. 5 as a transition from a first position illustrated in solid lines to a second position illustrated in dashed lines Referring collectively to FIGS. 1B and 5, when the throttle attachment 100 is positioned over and in contact with the throttle 26 of the towing tractor 12, the throttle 26 is positioned within the recess 104 of the attachment portion 102 and is in contact with the throttle attachment 100. To attach the throttle attachment 100 to the throttle 26 of the towing tractor 12, the throttle attachment 100 may be positioned over the steering handle 23 and moved along an axis of the handle such that the throttle 26 is positioned with the contours of the recess 104 of the throttle attachment 100 and the steering handle 23 is positioned within the steering handle opening 114.

When positioned over the throttle 26, the engagement between the attachment portion 102 of the throttle attachment 100 and the throttle 26 may hold the attachment portion 102 to the throttle 26. In some embodiments, a fastener may be inserted through the attachment portion 102 and into the throttle 26 such that the throttle attachment 100 and throttle 26 are fastened together. For example, and referring again to FIG. 3B, the joining wall 110 may have a fastener aperture 124, which may or may not be threaded, to allow passage of a screw or similar fastener therethrough and into a receiving hole of the throttle 26 for securing the throttle attachment 100 to the throttle 26.

Still referring to FIG. 5, the solid lines indicate the throttle attachment 100, and therefore the throttle 26, in a resting or neutral positon (e.g., positioned such that the towing trailer 12 is not in motion). The dashed lines illustrate the throttle attachment 100, and therefore the throttle 26, moved to an activated position. The elongate handle 130 may be of a length such that that elongate handle 130 is capable of contacting the hub 20 when the throttle attachment 100 is rotated far enough in the counterclockwise direction. According, the elongate handle 130 may act of a hard stop to prevent further rotation of the throttle 26. This may prevent over-rotation of the throttle 26.

It is noted that though the throttle attachment 100 is illustrated as positioned over one of the illustrated throttles 26, a throttle attachment may be positioned over the other of the two illustrated throttles 26. In some embodiments, a throttle attachment may be positioned over both throttles 26. For example, a throttle attachment that mirrors the orientation of throttle attachment 100 may be positioned on the opposite throttle.

It should now be understood that embodiments described herein are direct to a throttle attachment and a towing tractor assembly including a throttle attachment. As discussed, the throttle attachment is configured to be positioned over and in contact with a throttle of the towing tractor such that rotation of the throttle attachment causes the throttle to rotate and thus activates the throttle. By providing a throttle attachment as described herein, a position of engagement between the user and the throttle can be changed to allow for more comfortable engagement of the throttle. That is, the point of contact to activate the throttle may be changed so as to provide a more ergonomic position at which a user can engage the throttle. Furthermore, the throttle attachment can be configured to contact a hub of a towing tractor to prevent accidental over-rotation of the throttle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A throttle attachment comprising:
an attachment portion configured to engage a throttle of a vehicle, the attachment portion comprising:
a first side;
a second side spaced from the first side; and
a joining wall extending between the first side and the second side to connect the first side to the second side, wherein the attachment portion defines a recess, the recess having a throttle opening formed in the second side of the attachment portion shaped to receive a shape of the throttle, and a steering handle opening formed in the first side that is smaller than the throttle opening; and
an elongate handle extending from the attachment portion, wherein rotation of the elongate handle causes rotation of the throttle.

2. The throttle attachment of claim 1, wherein the recess substantially conforms to the shape of the throttle of the vehicle such that the recess is configured to receive at least a portion of the throttle therein.

3. The throttle attachment of claim 1, wherein the elongate handle extends from the first side of the attachment portion.

4. The throttle attachment of claim 1, wherein the joining wall is discontinuous along an outside perimeter of the attachment portion.

5. A towing tractor assembly comprising:
a towing tractor comprising a throttle comprising a center portion through which an axis of rotation extends and three wings that extend from the center portion; and
a throttle attachment comprising an attachment portion comprising a first attachment wing, a second attachment wing and a third attachment wing positioned over and in contact with the three wings of the throttle, wherein rotation of the throttle attachment causes rotation of the throttle.

6. The towing tractor assembly of claim 5, wherein the throttle attachment comprises
an elongate handle extending from the attachment portion, wherein rotation of the elongate handle causes rotation of the throttle.

7. The towing tractor assembly of claim 6, wherein the attachment portion of the throttle attachment defines a recess substantially conforming to a shape of the throttle of the towing tractor, wherein the throttle is positioned within the recess.

8. The towing tractor assembly of claim 6, wherein the attachment portion of the throttle attachment comprises:
a first side;
a second side spaced from the first side; and
a joining wall extending between the first side and the second side to connect the first side to the second side.

9. The towing tractor assembly of claim 8, wherein the attachment portion of the throttle attachment defines a recess that substantially conforms to a shape of the throttle of the towing tractor, wherein the recess extends through the second side of the throttle.

10. The towing tractor assembly of claim 8, wherein the elongate handle of the throttle attachment extends from the first side of the attachment portion.

11. The towing tractor assembly of claim 8, wherein the joining wall of the throttle attachment is discontinuous along an outside perimeter of the attachment portion of the throttle attachment.

12. The towing tractor assembly of claim 8, wherein the attachment portion of the throttle attachment defines a recess, the recess having a throttle opening formed in the second side of the attachment portion shaped to receive a shape of the throttle, and a steering handle opening formed in the first side that is smaller than the throttle opening.

13. A towing tractor assembly comprising:
a towing tractor comprising:
a steering assembly comprising a steering handle; and
a throttle rotatably coupled to the steering handle; and
a throttle attachment positioned over and in contact with the throttle, the throttle attachment comprising:
an attachment portion that extends around a portion of the steering handle and engages with the throttle of the towing tractor; and
an elongate handle extending from the attachment portion, wherein rotation of the elongate handle causes rotation of the throttle.

14. The towing tractor assembly of claim 13, wherein the attachment portion of the throttle attachment defines a recess substantially conforming to a shape of the throttle of the towing tractor, wherein the throttle is positioned within the recess.

15. The towing tractor assembly of claim 13, wherein the attachment portion of the throttle attachment comprises:
a first side;
a second side spaced from the first side; and
a joining wall extending between the first side and the second side to connect the first side to the second side.

* * * * *